United States Patent [19]

Rosenbaum et al.

[11] 4,390,497

[45] Jun. 28, 1983

[54] THERMAL-MECHANICAL TREATMENT OF COMPOSITE NUCLEAR FUEL ELEMENT CLADDING

[75] Inventors: Herman S. Rosenbaum, Fremont; John H. Davies, San Jose, both of Calif.

[73] Assignee: General Electric Company, San Jose, Calif.

[21] Appl. No.: 304,011

[22] Filed: Sep. 21, 1981

Related U.S. Application Data

[63] Continuation of Ser. No. 45,225, Jun. 4, 1979, abandoned.

[51] Int. Cl.³ .............................................. G21C 3/20
[52] U.S. Cl. ..................... 376/414; 376/417; 29/400 N
[58] Field of Search ............ 29/400 N; 376/414, 416, 376/417, 429; 148/11.5 F, 11.5 Q

[56] References Cited

U.S. PATENT DOCUMENTS

| | | | |
|---|---|---|---|
| 3,337,372 | 8/1967 | Reed-Hill | 148/11.5 F |
| 3,365,371 | 1/1968 | Lass et al. | 376/429 |
| 3,884,728 | 5/1975 | Levy | 148/11.5 F |
| 3,963,534 | 6/1976 | Frenkel et al. | 148/11.5 F |
| 4,108,687 | 8/1978 | Armand et al. | 148/11.5 F |
| 4,197,145 | 4/1980 | Hanneman et al. | 148/11.5 F |
| 4,200,492 | 4/1980 | Armijo et al. | 376/417 |

FOREIGN PATENT DOCUMENTS

933500  8/1963  United Kingdom ................ 376/414

OTHER PUBLICATIONS

Rare Metals Handbook, 2nd Ed., Reinhold Pub. Co. (London), (4/17/62), pp. 681–685, Hampel.
Zirconium 2nd Ed., Miller, (11/1/57) Butterworths Scientific Publications, pp. 470–477.
Metallurgical Dictionary, (1/31/53) Reinhold Pub. Co. (N.Y.) Henderson et al., p. 206.

Primary Examiner—Sal Cangialosi
Attorney, Agent, or Firm—Ivor J. James, Jr.; Samuel E. Turner; Raymond G. Simkins

[57] ABSTRACT

Cladding for nuclear fuel elements which is formed with a zirconium metal barrier layer bonded to the inside surface of a zirconium alloy tube and which is sized by a cold working tube reduction process and is heat treated after final reduction at a temperature and for a time period which allows substantially complete recrystallization of the zirconium metal barrier layer and provides a fine-grained microstructure therein and which stress-relieves but does not fully recrystallize the zirconium alloy tube. The crystallographic structure of the zirconium metal barrier layer may be improved by compressive deformation such as shot-peening.

25 Claims, 3 Drawing Figures

TUBE REDUCTION AND TREATMENT

| STEP NO. | STEP | THICKNESS OF COMPOSITE | OUTER DIAMETER | INNER DIAMETER |
|---|---|---|---|---|
| | START WITH TUBE SHELL | 0.430 | 2.5 | 1.64 |
| (1) | CLEAN FOR ANNEAL (degrease-soap base caustic) | | | |
| (2) | ANNEAL - 1250° F - 1 HOUR | | | |
| (3) | FIRST REDUCTION PASS | 0.22 | 1.45 | 1.01 |
| (4) | CLEAN FOR ANNEAL | | | |
| (5) | ANNEAL - 1150° F - 1 HOUR | | | |
| (6) | SECOND REDUCTION PASS | 0.095 | 0.800 | 0.610 |
| (7) | CLEAN FOR ANNEAL | | | |
| (8) | ANNEAL - 1150° F - 1 HOUR | | | |
| (9) | THIRD REDUCTION PASS | 0.033 | 0.485 | 0.419 |
| (10) | SHOT PEEN INNER SURFACE | | | |
| (11) | CLEAN FOR HEAT TREATMENT | | | |
| (12) | HEAT TREAT 900° F - 4 HOURS | | | |
| (13) | ETCH TO ⟶ | 0.032 | 0.484 | 0.420 |

FINAL THICKNESS OF BARRIER LAYER - 3.4 ± 0.3 mils

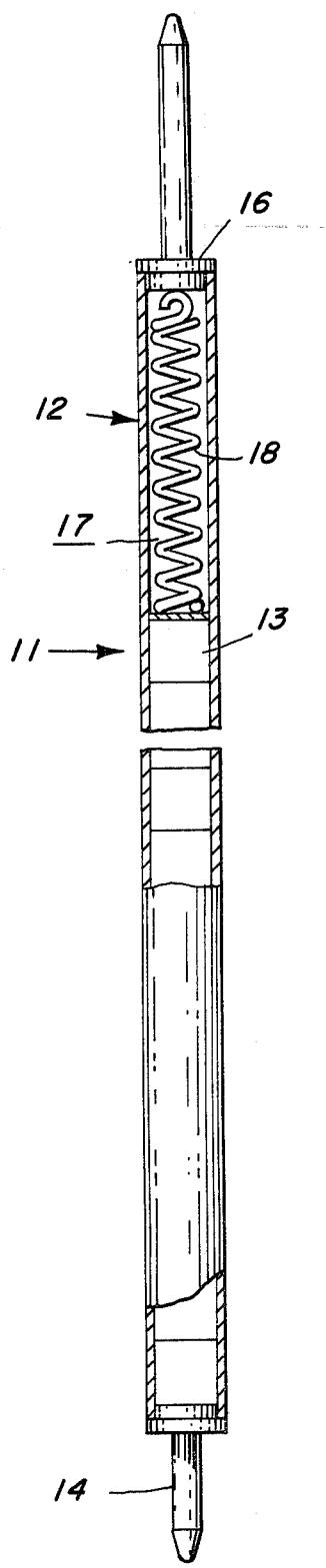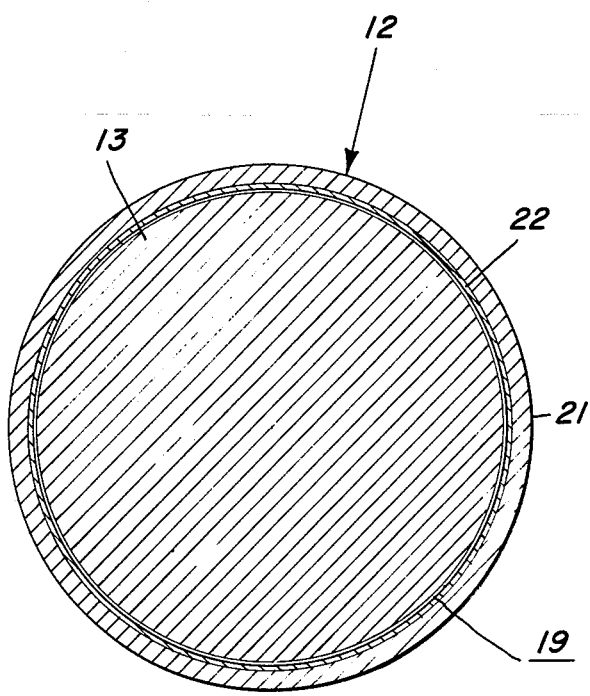
Fig. 1
Fig. 2

TUBE REDUCTION AND TREATMENT

| STEP NO. | STEP | THICKNESS OF COMPOSITE | OUTER DIAMETER | INNER DIAMETER |
|---|---|---|---|---|
| (1) | START WITH TUBE SHELL | 0.430 | 2.5 | 1.64 |
| (2) | CLEAN FOR ANNEAL (degrease - soap base caustic) | | | |
| (3) | ANNEAL - 1250° F - 1 HOUR | | | |
| (4) | FIRST REDUCTION PASS | 0.22 | 1.45 | 1.01 |
| (5) | CLEAN FOR ANNEAL | | | |
| (6) | ANNEAL - 1150° F - 1 HOUR | | | |
| (7) | SECOND REDUCTION PASS | 0.095 | 0.800 | 0.610 |
| (8) | CLEAN FOR ANNEAL | | | |
| (9) | ANNEAL - 1150° F - 1 HOUR | | | |
| (10) | THIRD REDUCTION PASS | 0.033 | 0.485 | 0.419 |
| (11) | SHOT PEEN INNER SURFACE | | | |
| (12) | CLEAN FOR HEAT TREATMENT | | | |
| (13) | HEAT TREAT 900° F - 4 HOURS | | | |
| (14) | ETCH TO | 0.032 | 0.484 | 0.420 |

FINAL THICKNESS OF BARRIER LAYER - 3.4 ± 0.3 mils

Fig. 3

THERMAL-MECHANICAL TREATMENT OF COMPOSITE NUCLEAR FUEL ELEMENT CLADDING

The Government has rights in this invention persuant to Subcontract No. 3-20-46 under Prime Contract No. EN-77-C-02-4473.

This application is a continuation application of Ser. No. 45,225, filed June 4, 1979, and now abandoned.

This is a continuation of application Ser. No. 045,225, filed June 4, 1979, now abandoned.

BACKGROUND

Water cooled and moderated nuclear power reactors are well-known and are discussed, for example, by M. M. El-Wakil in "Nuclear Power Engineering" McGraw-Hill Book Company, Inc., 1962.

Fuel elements for such reactors typically are in the form of uranium oxide and/or plutonium oxide pellets contained in a protective, elongated cladding tube formed of a suitable metal, commonly a zirconium alloy such as Zircaloy-2. Such a fuel element is shown, for example, in U.S. Pat. No. 3,365,371.

To prevent premature failure of the fuel element cladding and to extend its useful mechanical life, various protective barriers between the column of fuel pellets and the inner surface of the cladding have been proposed. Among these barriers are layers of zirconium metal bonded to the inner surface of the zirconium alloy of the cladding tube.

In copending patent application Ser. No. 727,183, filed Sept. 27, 1976, now abandoned in favor of continuation application Ser. No. 014,348, filed Feb. 23, 1979, now U.S. Pat. No. 4,372,817, and in continuation-in-part application Ser. No. 838,161, filed Sept. 30, 1977, and now U.S. Pat. No. 4,200,492, each assigned to the same assignee as this invention, there is described a barrier layer formed of substantially pure zirconium metal bonded to the inner surface of the cladding tube.

In copending patent application Ser. No. 838,161, filed Sept. 30, 1977, now U.S. Pat. No. 4,200,492 and assigned to the same assignee as this invention, there is described a barrier layer formed of zirconium metal of moderate purity such as sponge zirconium.

An object of this invention is a method of forming a layer of zirconium metal on the inner surface of a fuel element cladding tube with enhancement of the characteristics of the zirconium layer as a protective barrier.

SUMMARY

In the conventional process for producing cladding tubing with a barrier layer bonded to the inside surface thereof, a hollow billet of zirconium alloy is fitted with a sleeve of the zirconium metal for the barrier layer and the composite is co-extruded. The composite is then reduced to final diameters by cold working by multiple passes through a reduction device such as a pilger tube reduction machine.

After each reduction pass it is conventional to anneal the composite by heat treatment at a temperature and for a time period sufficient to substantially fully recrystallize the zirconium alloy.

However, it is found that the annealing temperatures and times needed for full recrystallization of the zirconium alloy cause undesirable grain growth in the zirconium metal barrier layer.

Thus, in accordance with one aspect of this invention the heat treatment of the composite, after the final size reduction step, is carried out at a temperature and for a time period which allows substantially complete recrystallization of the zirconium metal layer, and provides a fine-grained microstructure therein, and which stress relieves but does not fully recrystallize the zirconium alloy.

In accordance with another aspect of the invention, the crystallographic texture of the zirconium metal layer, optionally, can be improved by compressive deformation of the surface of the layer, for example, by shot-peening, without deformation of the zirconium alloy of the composite tubing.

DRAWING

The invention is described in greater detail hereinafter with reference to the accompanying drawing wherein:

FIG. 1 is a partly cutaway elevation view of a nuclear fuel element;

FIG. 2 is a transverse cross section view of the fuel element of FIG. 1; and

FIG. 3 is a chart of an example tube reduction and treatment method in accordance with the invention.

DESCRIPTION

A nuclear fuel element 11, as illustrated in FIGS. 1 and 2, comprises an elongated composite cladding tube 12 containing a column of fuel pellets 13 and it is sealed at its ends by lower and upper end plugs 14 and 16.

A plenum space 17 is provided to allow longitudinal expansion of the fuel and to provide space for gases released from the fuel during operation in the reactor. A spring 18 between the top of the fuel column and the upper end plug 16 retains the fuel column in position. As best shown in FIG. 2, the composite cladding tube 11 is sized with respect to the diameter of the fuel pellets to provide an annular clearance space or gap 19 between the fuel pellets and the inner surface of the cladding tube.

In a preferred embodiment of the invention, the composite cladding tube 11 includes a cladding tube 21 formed of a zirconium alloy and a barrier layer 22 of zirconium metal metallurgically bonded to the inner surface of the tube 21.

Among the zirconium alloys suitable for tube 21 are Zircaloy-2 and Zircaloy-4. Zircaloy-2 contains, on a weight basis, about 1.5 percent tin, 0.12 percent iron, 0.09 percent chromium, 0.005 percent nickel and the balance zirconium. Zircaloy-4 has less nickel than Zircaloy-2 but contains slightly more iron. In either case the alloy contains constituents other than zirconium in an amount greater than 5,000 parts per million.

The barrier layer 22, which may comprise from about 1 to about 30 percent of the thickness of the composite cladding, is formed of zirconium metal of limited impurity content ranging from high purity or substantially pure zirconium of less than 500 parts per million (ppm) impurities to an impurity content of up to 5,000 ppm but preferably of impurity content of less than about 4,200 ppm.

Of the impurities, oxygen content should be minimized and kept within a range of 200 ppm or less to a maximum of about 1,200 ppm. Other impurities may be within the normal range for commercial reactor grade sponge zirconium and are listed as follows: aluminum—75 ppm or less; boron—0.4 ppm or less; cadmium—0.4 ppm or less; carbon—270 ppm or less; chromium—200 ppm or less; cobalt—20 ppm or less; copper—50 ppm or less; hafnium—100 ppm or less; hydrogen—25 ppm or less; iron—1500 ppm or less; magnesium—20 ppm or less; manganese—50 ppm or less; molybdenum—50 ppm or less; nickel—70 ppm or less; niobium—100 ppm or less; nitrogen—80 ppm or less; silicon—120 ppm or less; tin—50 ppm or less; tungsten—100 ppm or less; titanium—50 ppm or less; and uranium—3.5 ppm or less.

The zirconium metal barrier layer 22 is metallurgically bonded to the zirconium alloy tube 21 with sufficient cross diffusion therebetween to form a strong bond but with insufficient diffusion to contaminate the barrier layer 22 more than about one-half to one mil from the bond interface.

It is found that a zirconium metal barrier layer of in the order of 5 to 15 percent of the thickness of the composite cladding, and of a particularly preferred thickness of about 10 percent, prevents exposure of the zirconium alloy of the cladding tube 21 to the corrosive fission products.

The barrier layer also separates the zirconium alloy cladding tube from direct mechanical interaction with the fuel pellets and reduces the stresses that can result therefrom. The barrier layer is found to maintain its desirable structural properties such as yield strength and hardness at levels considerably lower than those of conventional zirconium alloys. In effect, the metal barrier does not harden as much as conventional zirconium alloys when subjected to irradiation and this, together with its initially low yield strength, enables the metal barrier to deform plastically and relieve pellet-induced stresses in the fuel element during power transients. Pellet induced stresses in the fuel element can be brought about, for example, by swelling of the pellets of nuclear fuel at reactor operating temperatures so that the pellet comes into contact with the cladding.

The composite cladding of this invention can be fabricated by any of the following methods.

In one method a hollow tube of the zirconium metal selected to be the barrier layer is inserted into a hollow billet of the zirconium alloy selected to form the cladding tube. The assembly then is subjected to explosive bonding of the tube to the billet. The composite is extruded at elevated temperature of about 1000° to about 1400° F. (about 538° to about 760° C.) using conventional tube shell extrusion techniques. The extruded composite is then subjected to a process involving conventional tube reduction until the desired size of the composite cladding is achieved.

In another method, a hollow tube of the zirconium metal selected to be the barrier layer is inserted into a hollow billet of the zirconium alloy selected to form the cladding tube. The assembly then is subjected to a heating step, such as at 1400° F. (760° C.) for about 8 hours, to produce diffusion bonding between the zirconium metal tube and the billet. The composite is then extruded using conventional tube shell extrusion techniques and the extruded composite is subjected to a process involving conventional tube reduction until the desired size of cladding is achieved.

In still another method, a hollow tube of the zirconium metal selected to be the barrier layer is inserted into a hollow billet of the zirconium alloy selected to form the cladding tube. This assembly then is extruded using conventional tube shell extrusion techniques. Then the extruded composite is subjected to a process involving conventional tube reduction until the desired size of cladding is achieved.

The dimensions of the starting materials are determined by ratios of the cross sectional areas of the barrier layer and the zirconium alloy portions of the desired composite cladding product. For example, the total cross sectional area of the final cladding is given by $$A_{TF} = \pi/4(OD_{TF}^2 - ID_{TF}^2),$$

where $A_{TF}$ is the area of the final product, $OD_{TF}$ is the outer diameter of the final product, and $ID_{TF}$ is the inner diameter of the final product. The cross sectional area of the desired barrier is given by $$A_{BF} = \pi/4(OD_{BF}^2 - ID_{BF}^2),$$

where $A_{BF}$ is cross sectional area of the metal barrier, $OD_{BF}$ is outer diameter of the metal barrier, and $ID_{BF}$ is the inner diameter of the metal barrier. The total cross section of the initial billet of the cladding tube is given by $$A_{TI} = \pi/4(OD_{TI}^2 - ID_{TI}^2)$$

where $A_{TI}$ is the total cross sectional area of the initial billet including the metal barrier, $OD_{TI}$ is the outer diameter of the initial billet, and $ID_{TI}$ is the inner diameter of the initial billet. The required cross sectional area of the initial barrier is determined by $$A_{BI} = A_{TI}\left(\frac{A_{BF}}{A_{TF}}\right).$$

EXAMPLE

An example of making a composite cladding tube 11 in accordance with the invention is as follows.

A billet for the zirconium alloy cladding tube and the insert for the zirconium metal barrier layer are machined, cleaned and assembled by standard procedures, the dimensions being selected for extrusion of the composite assembly in a hot extrusion press. The billet for the cladding tube consists of normal Zircaloy-2 alloy conforming to ASTM B353, Grade RA-1 and the insert for the barrier layer consists of zirconium metal with impurity content within the limits set forth hereinbefore. The bores of the billet and insert are formed with an 8 mil per inch taper and pressed together to ensure good contact between the mating surfaces.

Example dimensions of the machined parts are as follows: for the cladding tube billet—9.0 in length, 5.74 in outside diameter, 2.44 in inside diameter; for the barrier layer insert—2.44 in outside diameter, 1.66 in inside diameter.

Prior to assembly, the mating surfaces of the billet and insert are lightly etched to remove traces of impurities. A suitable etchant is a solution of 70 ml H$_2$O, 30 ml HNO$_3$ (70% AQ) and 5 ml HF (48% AQ).

To assure a satisfactory bond during extrusion the assembly may be pre-bonded by pressing the tapered insert into the tapered bore of the billet in a vacuum ≦20 μm of mercury while maintaining a temperature of about 1400° F. (760° C.) for 8 hours with initial pressing forces of 30–45,000 lbs. This is found to provide bonding over 20–25 percent of the interface area.

To reduce end losses during extrusion, 2 inch long pieces of Zircaloy-2 may be welded to each end of the pre-bonded assembly and machined flush.

The extrusion of the pre-bonded billet assembly into a cladding tube shell is accomplished using the following parameters: extrusion rate—6 in/min, reduction ratio—6:1, temperature—1100° F. and extrusion force—3500 tons.

All billet surfaces except the bore and floating mandrel may be lubricated with a water soluble lubricant baked on at 1300° F. for 1 hour. After extrusion both ends of the tube shell are cut clean from the added end pieces and the inner surface honed to remove any surface flaws and improve the finish.

The final reduction of the composite tube shell to tubing of suitable size for fuel element cladding is accomplished by cold working in three passes through a well-known pilger tube reduction machine with heat treatment and cleaning between passes. The steps of a representative reduction process are set forth in FIG. 3.

The reduction process is conventional except for the modifications according to the subject invention. The basis for these modifications and the beneficial results obtained thereby will now be discussed.

The severe cold working that takes place in the tube reduction passes results in distortion of the shapes of the metal crystallites and produces many crystal defects within the crystallites. Thus cold worked metals are in a relatively high energy state which is not thermally stable. The process of metallurgical annealing uses heat to impart mobility to the atoms of the metal and allows them to rearrange themselves into a lower energy configuration, such annealing being a function of both temperature and time with temperature being the more sensitive parameter. In general the annealing temperature and time are selected to be sufficient to provide substantially complete recrystallization but insufficient to allow excessive crystal or grain growth.

Thus for the annealing steps (5) and (8) of the reduction process of FIG. 3, the temperatures and times are selected to provide substantially complete recrystallization of the zirconium alloy of the tube 21.

However, the relatively purer metal of the barrier layer 22 recrystallizes at a lower temperature and it is found that the conventional annealing temperatures and times suitable for the zirconium alloy, as in steps (5) and (8), causes grain growth in the barrier layer metal to an extent undesirable in the finished product.

Therefore in accordance with one aspect of the invention, after the final reduction pass the composite tube is heat treated at a lower temperature as shown in step (12).

Thus the temperature and time of the heat treatment of step (12) are selected such that the zirconium metal of the barrier layer 22 is substantially fully recrystallized without grain growth. This provides a barrier layer with a fine grained equi-axed microstructure with improved strength and ductility, increased resistance to stress corrosion cracking and high plastic stability.

The temperature and time of the heat treatment step (12) are also selected in consideration of providing full stress relief but not full recrystallization of the zirconium alloy of tube 21. This results in the additional advantage that the zirconium alloy retains the elongated grain structure imparted by the reduction process and has higher strength at high strain rates while still being relieved of internal stresses.

Suitable temperatures and times for the annealing steps (2), (5) and (8) are in ranges from about 1000° F. (538° C.) to 1300° F. (704° C.) for about 1–15 hours and preferably for about 1–4 hours.

Suitable temperatures and times for heat treatment step (12) are in ranges from about 825°–950° F. (440°–510° C.) for about 1–4 hours.

In accordance with another aspect of the invention the crystallographic texture (that is, the degree of preferred crystallographic orientation) of the zirconium metal barrier layer, optionally can be improved by mechanical, compressive deformation of the surface thereof. For example, before the final heat treatment step (12) the barrier layer can be shot-preened from inside the assembly to provide compressive deformation of this layer without significant deformation of the zirconium alloy tube.

Such mechanical treatment prior to final heat treatment, shown as step (10) in FIG. 3 provides improved crystallographic structure with basal poles {0002} strongly aligned in the radial direction of the composite cladding tube.

We claim:
1. A method of making an elongated composite cladding tube for containing nuclear fuel as a fuel element for a nuclear reactor, said cladding tube being formed from a cladding tube shell comprised of a zirconium alloy tube containing constituents other than zirconium in an amount greater than about 5000 parts per million and having a protective barrier layer of zirconium metal containing impurities of less than 5000 parts per million metallurgically bonded to the inside surface thereof, said protective barrier of zirconium metal being about 1 to about 30 percent of the thickness of the composite cladding tube, consisting essentially of the steps of:
   (1) reducing the diameter of said cladding tube shell composed of the zirconium alloy tube with the protective zirconium metal layer bonded to the inside surface thereof by cold working in a series of reduction steps to the desired inside diameter and wall thickness;
   (2) heat treating said cladding tube shell between each of said reduction steps at a temperature and for a time period sufficient to substantially fully recrystallize said zirconium alloy;
   (3) heat treating said cladding tube after the final one of said reduction steps at a lower temperature and for a time period which allows substantially complete recrystallization of said zirconium metal layer and provides a fine-grained microstructure therein and which stress-relieves but does not fully recrystallize said zirconium alloy.

2. The method of claim 1 wherein the temperature and time of step (2) are from about 538° C. to about 704° C. and from about 1 hour to about 15 hours, respectively and wherein the temperature and time of step (3) are from about 440° C. to about 510° C. and from about 1 hour to about 4 hours, respectively.

3. The method of claim 1 including the further step of substantially uniformly compressively deforming the surface of said zirconium metal protecting barrier layer bonded to the inside surface of the zirconium alloy tube before the heat treatment step (3).

4. The method of claim 3 wherein said deforming is accomplished by shot-peening the protective barrier layer of zirconium metal bonded to the inside surface of the zirconium alloy tube from inside the cladding tube shell.

5. An elongated composite cladding tube for containing nuclear fuel as a fuel element for a nuclear reactor, said composite cladding tube consisting essentially of an assembly of a zirconium alloy tube containing constituents other than zirconium in an amount greater than about 5000 parts per million and having a protective barrier layer of zirconium metal containing impurities of less than 5000 parts per million metallurgically bonded to the inside surface thereof, said protective barrier layer of zirconium metal being about 1 to about 30 percent of the thickness of the composite cladding tube assembly, said zirconium metal layer being substantially fully recrystallized to provide a fine-grained microstructure therein, and said zirconium alloy tube being substantially fully stress-relieved but not fully recrystallized, said composite cladding tube comprising the product of a multiplicity of diameter reduction steps followed by heat treatments.

6. The composite cladding tube of claim 5 wherein the surface of said zirconium metal protective barrier layer bonded to the inside surface of the zirconium alloy tube is compressively deformed from inside the tube shell.

7. The composite cladding tube of claim 6 wherein said deforming is accomplished by shot-peening the protective barrier layer of zirconium metal bonded to the inside surface of the zirconium alloy tube from inside the cladding tube shell.

8. A method of making an elongated composite cladding tube for containing nuclear fuel as a fuel element for a nuclear reactor, said composite cladding tube being formed from a cladding tube shell comprised of an assembly of a zirconium alloy tube containing constituents other than zirconium in an amount greater than about 5000 parts per million and a hollow tube of zirconium metal containing impurities of less than 500 parts per million metallurgically bonded to the inside surface of said tube shell and providing a protective barrier layer for the inside surface thereof, said protective barrier layer of zirconium metal being about 1 to about 30 percent of the thickness of the composite cladding tube assembly, consisting essentially of the steps of:

(1) reducing the diameter of said composite cladding tube shell composite of the assembly of a zirconium alloy tube and zirconium metal hollow tube bonded to the inside surface thereof by cold working the assembly in a series of reduction steps of the desired inside diameter and wall thickness of said assembly;

(2) heat treating said composite cladding tube shell between each of said reduction steps at a temperature and for a time period sufficient to substantially fully recrystallize said zirconium alloy;

(3) heat treating said composite cladding tube shell after the final one of said reduction steps at a lower temperature and for a time period which allows substantially complete recrystallization of said zirconium metal layer and provides a fine-grained microstructure therein and which stress-relieves but does not fully recrystallize said zirconium alloy.

9. The method of claim 8 wherein the temperature and time of step (2) are from about 538° C. to about 704° C. and from about 1 hour to about 15 hours, respectively and wherein the temperature and time of step (3) are from about 440° C. to about 510° C. and from about 1 hour to about 4 hours, respectively.

10. The method of claim 8 including the further step of substantially uniformly compressively deforming the surface of said zirconium metal hollow tube providing the protective barrier layer bonded to the inside surface of the zirconium alloy tube before the heat treatment step (3).

11. The method of claim 10 wherein said deforming is accomplished by shot-peening the protective barrier layer of the hollow tube of zirconium metal from inside the cladding tube shell assembly.

12. An elongated composite cladding tube for containing nuclear fuel as a fuel element for a nuclear reactor, said composite cladding tube consisting essentially of an assembly of a zirconium alloy tube containing constituents other than zirconium in an amount greater than about 5000 parts per million and a hollow tube of zirconium metal containing impurities of less than 5000 parts per million metallurgically bonded to the inside surface of said tube shell and providing a protective barrier layer for the inside surface thereof, said zirconium metal of the hollow tube providing the protective barrier layer being substantially fully recrystallized to provide a fine-grained microstructure therein, and said zirconium alloy tube being substantially fully stress-relieved but not fully recrystallized, said protective barrier layer of zirconium metal being about 1 to about 30 percent of the thickness of the composite cladding tube assembly, said composite cladding tube assembly comprising the product of a multiplicity of diameter reduction steps followed by heat treatments.

13. The composite cladding tube of claim 12 wherein the surface of said zirconium metal hollow tube providing the protective barrier layer bonded to the inside surface of the zirconium alloy tube is compressively deformed from inside the tube shell assembly.

14. The composite cladding tube of claim 13 wherein said deforming is accomplished by shot-peening the protective barrier layer of the hollow tube of zirconium metal from inside the cladding tube shell assembly.

15. The method of claim 1, wherein the zirconium metal barrier layer is of a thickness of about 5 to about 15 percent of the total thickness of the composite cladding tube.

16. The elongated composite cladding tube of claim 5, wherein the zirconium metal barrier layer is of a thickness of about 5 to about 15 percent of the total thickness of the composite cladding tube.

17. The method of claim 8, wherein the hollow tube of zirconium metal providing the protective barrier layer is of a thickness of about 5 to about 15 percent of the total thickness of the assembly forming the composite cladding tube.

18. The elongated composite cladding tube of claim 12, wherein the hollow tube of zirconium metal providing the protective barrier layer is of a thickness of about 5 to about 15 percent of the total thickness of the assembly forming the composite cladding tube.

19. The method of claim 1 wherein nuclear fuel pellets sized smaller than the inside diameter of the composite cladding tube whereby there is provided an annular clearance space between the fuel pellets and the inner surface of the cladding tube are inserted into the composite cladding tube subsequent to the heat treatment of step (3).

20. The elongated composite cladding tube of claim 5, wherein the composite cladding tube contains nuclear fuel pellets sized smaller than the inside diameter of the composite cladding tube whereby there is provided an annular clearance space between the fuel pellets and the inner surface of the cladding tube.

21. The method of claim 8, wherein nuclear fuel pellets sized smaller than the inside diameter of the composite cladding tube whereby there is provided an annular clearance space between the fuel pellets and the inner surface of the cladding tube are inserted into the composite cladding tube subsequent to the heat treatment of step (3).

22. The elongated composite cladding tube of claim 12 wherein the composite cladding tube contains nuclear fuel pellets sized smaller than the inside diameter of the composite cladding tube whereby there is provided an annular clearance space between the fuel pellets and the inner surface of the cladding tube.

23. A method of making an elongated composite cladding tube for containing nuclear fuel as a fuel element for a nuclear reactor comprising a composite cladding tube shell assembled of a tube of zirconium alloy having a protective barrier of zirconium metal bonded to its inside surface, said protective barrier of zirconium metal being about 1 to about 30 percent of the thickness of the composite cladding tube, comprising the steps of:
  (1) assembling a composite cladding tube shell by inserting a hollow tube of zirconium metal containing impurities of less than 5000 parts per million into the inside of a hollow tube of zirconium alloy and bonding the zirconium metal tube to the inside surface of the tube of zirconium alloy;
  (2) reducing the diameter of said assembled composite cladding tube shell of a zirconium metal tube inserted inside a tube of zirconium alloy in a series of reduction steps to the desired inside diameter and wall thickness;
  (3) heat treating said assembled composite cladding tube shell between each of said reduction steps at a temperature and for a time period sufficient to substantially fully recrystallize said zirconium alloy;
  (4) heat treating said composite cladding tube shell after the final one of said reduction steps at a lower temperature and for a time period which allows substantially complete recrystallization of said zirconium metal layer and provides a fine-grained microstructure therein and which stress-relieves but does not fully recrystallize said zirconium alloy.

24. The method of claim 23, wherein the zirconium metal barrier layer is of a thickness of about 5 to about 15 percent of the total thickness of the composite cladding tube.

25. An elongated composite cladding tube for containing nuclear fuel as a fuel element for a nuclear reactor, said composite cladding tube comprising an assembly of a zirconium alloy tube containing constituents other than zirconium in an amount greater than about 5000 parts per million and a hollow tube of zirconium metal containing impurities of less than 5000 parts per million inserted into and bonded to the inside surface of said alloy tube and providing a protective barrier layer for the inside surface thereof, and containing therein nuclear fuel pellets sized smaller than the inside of the composite cladding tube whereby there is provided an annular clearance space between the fuel pellets and the inner surface of the composite cladding tube, said zirconium metal of the hollow tube providing the protective barrier layer being substantially fully recrystallized to provide a fine-grained microstructure therein, and said zirconium alloy tube being substantially fully stress-relieved but not fully recrystallized, said protective barrier layer of zirconium metal being about 1 to about 30 percent of the thickness of the composite cladding tube, said composite cladding tube comprising the product of a multiplicity of diameter reduction steps followed by heat treatments.

* * * * *